United States Patent
Gropper et al.

[11] Patent Number: 6,166,597
[45] Date of Patent: Dec. 26, 2000

[54] METHOD FOR FEEDBACK CONTROL OF A CONTROLLED VARIABLE

[75] Inventors: Karl-Josef Gropper, Senden; Herbert Knotz, Erbach, both of Germany

[73] Assignee: Temic Semiconductor GmbH, Heilbronn, Germany

[21] Appl. No.: 09/317,422

[22] Filed: May 24, 1999

[30] Foreign Application Priority Data

May 22, 1998 [DE] Germany ................... 198 23 096

[51] Int. Cl.[7] .............................. H03F 17/00; H03G 3/20
[52] U.S. Cl. .......................... 330/59; 330/136; 330/141
[58] Field of Search ........................... 330/59, 136, 141, 330/279, 281, 308

[56] References Cited

U.S. PATENT DOCUMENTS

| | | | |
|---|---|---|---|
| 4,839,573 | 6/1989 | Wise | 318/615 |
| 5,319,539 | 6/1994 | Shinskey | 364/157 |
| 5,406,474 | 4/1995 | Hansen | 364/148 |
| 5,587,896 | 12/1996 | Hansen et al. | 364/148 |
| 5,955,921 | 9/1999 | Ide et al. | 330/136 X |

FOREIGN PATENT DOCUMENTS

| | | |
|---|---|---|
| 0 360 206 | 3/1990 | European Pat. Off. . |
| 0 448 776 | 10/1991 | European Pat. Off. . |
| 34 33 410 | 3/1986 | Germany . |
| 196 19 271 | 11/1997 | Germany . |
| WO 96/20521 | 7/1996 | WIPO . |

*Primary Examiner*—Steven J. Mottola
*Attorney, Agent, or Firm*—Venable; George Spencer; Robert Kinberg

[57] ABSTRACT

Method for automatically controlling a controlled variable. In a feedback control process, a control loop is used to compare the controlled variable with a command variable that determines the setpoint of the controlled variable and minimizes a deviation between setpoint and actual value of the controlled variable with the help of a manipulated variable that acts on the controlled variable. A disadvantage of this process is the transient behavior of the control loop due to temperature influences and degradation phenomena. The method according to the invention is intended to prevent a change in the transient behavior of the control loop. In accordance with the invention, the loop gain (A) of the control loop (1) is regulated to a value at which the actual value of the controlled variable (x) overshoots the setpoint value (s) by a predetermined tolerance value (m) as the result of a pulse-shaped change in the command variable (w). Consequently, the controlled variable (x) settles to the setpoint value (s) in a minimum of time and ensures stable feedback control operation. The circuiting of the invention is suited for feedback control of the emission power of light sources, in particular of laser diodes.

13 Claims, 2 Drawing Sheets

6,166,597

METHOD FOR FEEDBACK CONTROL OF A CONTROLLED VARIABLE

BACKGROUND OF THE INVENTION

The invention relates to a method for feedback control of a controlled variable.

In a feedback control process, a control loop, formed from a feedback control system that has an influence on the behavior of the feedback control and from a controlled system that effects feedback, is used to compare the actual value of a controlled variable (the physical quantity to be controlled) with a command variable corresponding to the setpoint value of the controlled variable. And a deviation between setpoint value and actual value of the controlled value is minimized with the help of a manipulated variable that acts on the controlled variable.

In a second or higher order control loop, the actual value of the controlled variable can overshoot the setpoint value as a result of a step change in the command variable. The transient behavior of the control loop has been found to be disadvantageous because it is dependent on temperature influences and degradation phenomena. This dependence can lead to a slow settling phase or to an unstable working point in which the controlled variable is excited to oscillation even by slight disturbances.

SUMMARY OF THE INVENTION

The object of the invention is to specify a simple method in for regulating the controlled variable by means of a control loop with an inputted command variable which these disadvantages are avoided and which has comparatively advantageous properties.

In accordance with the invention, the object is solved by regulating the loop gain of the control loop to a value at which the actual value of the controlled variable overshoots the setpoint value by a predetermined tolerance value where the regulation is a result of a pulse-shaped change in the command variable. Advantageous variants and developments are given in the Subclaims.

The invention provides for the loop gain of the control loop, i.e. the total gain in the signal path of the control loop, being automatically controlled, where the feedback control of the loop gain is effected in such a way that the actual value of the controlled variable overshoots the setpoint value of the controlled variable by a preset tolerance value when the command variable change is pulse-shaped.

Preferably, the loop gain of the control loop is controlled by varying the gain of a control amplifier in the control loop that contributes to the loop gain of the control loop and is driven accordingly by a gain controller.

In an advantageous development of the method, the control deviation required to adjust the controlled variable is determined by means of a setpoint comparison stage which forms a control deviation variable corresponding to the difference between the command variable and the actual value of the controlled variable. In the gain controller, the control deviation variable is compared with the tolerance value and the loop gain of the control loop is then adjusted in accordance with the results of this comparison.

The tolerance value is preferably specified by the command variable, in which case it has been found to be particularly advantageous to vary the tolerance value in proportion to a change in the amplitude of the command variable.

The advantages of the method according to the invention are that:

the loop gain and thus the behavior of the feedback control are independent of temperature influences and degradation phenomena;

there is no need to make manual adjustments to the control loop when starting up or during operation;

the control loop can be made at low cost because no components with small tolerances of the component parameters are required and because it can for the most part be integrated monolithically;

an optimum pulse shape of the controlled variable (i.e. the steepest possible signal edges which lead to no instability) is ensured and hence reliable and stable feedback control operation.

The method according to the invention is excellently suited for use in automatically controlling the radiation power of a light source operating in the pulse mode, in particular a laser diode or light-emitting diode.

DESCRIPTION OF THE PREFERRED EMBODIMENTS

The invention will now be described in more detail on the basis of an embodiment example with reference to the Figures.

Figure 1:
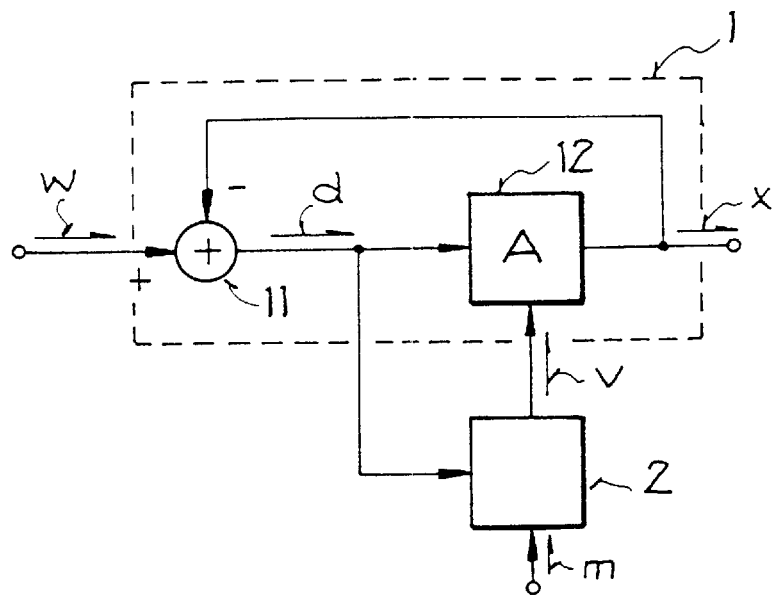
FIG. 1 an equivalent circuit diagram of a control loop with a gain controller for feedback control of the loop gain of the control loop.

In accordance with FIG. 1, the control loop 1 comprises a setpoint comparison stage 11 and a feedback stage 12 with at least two terminals connected behind it. The controlled variable x and the command variable w that determines the setpoint value of the controlled variable x are compared with each other in the setpoint comparison stage 11. As an output signal, the setpoint comparison stage 11 supplies a control deviation variable d which represents the difference between the actual value of the controlled variable x and the setpoint of the controlled variable x. This is fed to the feedback stage 12 which generates from it the controlled variable x in accordance with its gain A. The control deviation variable d is also fed to a gain controller 2 which is also supplied with a preset tolerance value m and generates a gain controlled variable v that acts on the gain A of the feedback stage 12, i.e. on the loop gain of the control loop 1. With the gain controlled variable v, the gain A of feedback stage 12 is automatically regulated to a value given by the tolerance value m. The gain controller 2 and the feedback stage 12 thus form a control loop superimposed on the control loop 1.

The control deviation variable d is advantageously provided in the form of a differential signal because then the control behavior of the control loop 1 is not affected, or is affected only to a minor extent, by the fluctuations of the d.c. working point.

The feedback of the controlled variable x to the setpoint comparison stage 11 causes the control deviation variable d to minimize so that the controlled variable x is corrected to the setpoint determined by the command variable w. As a result of desired or parasitic capacitances or inductances, the gain A of feedback stage 12 and the phase shift in control loop 1 are dependent on the frequency. A change in the loop gain A due to temperature changes or degradation phenomena, for instance, would therefore lead to a change in the transient behavior of control loop 1. This, however, is avoided by regulating the loop gain A to the value which is predetermined by the tolerance value m and independent of temperature influences or degradation phenomena.

Figure 2:
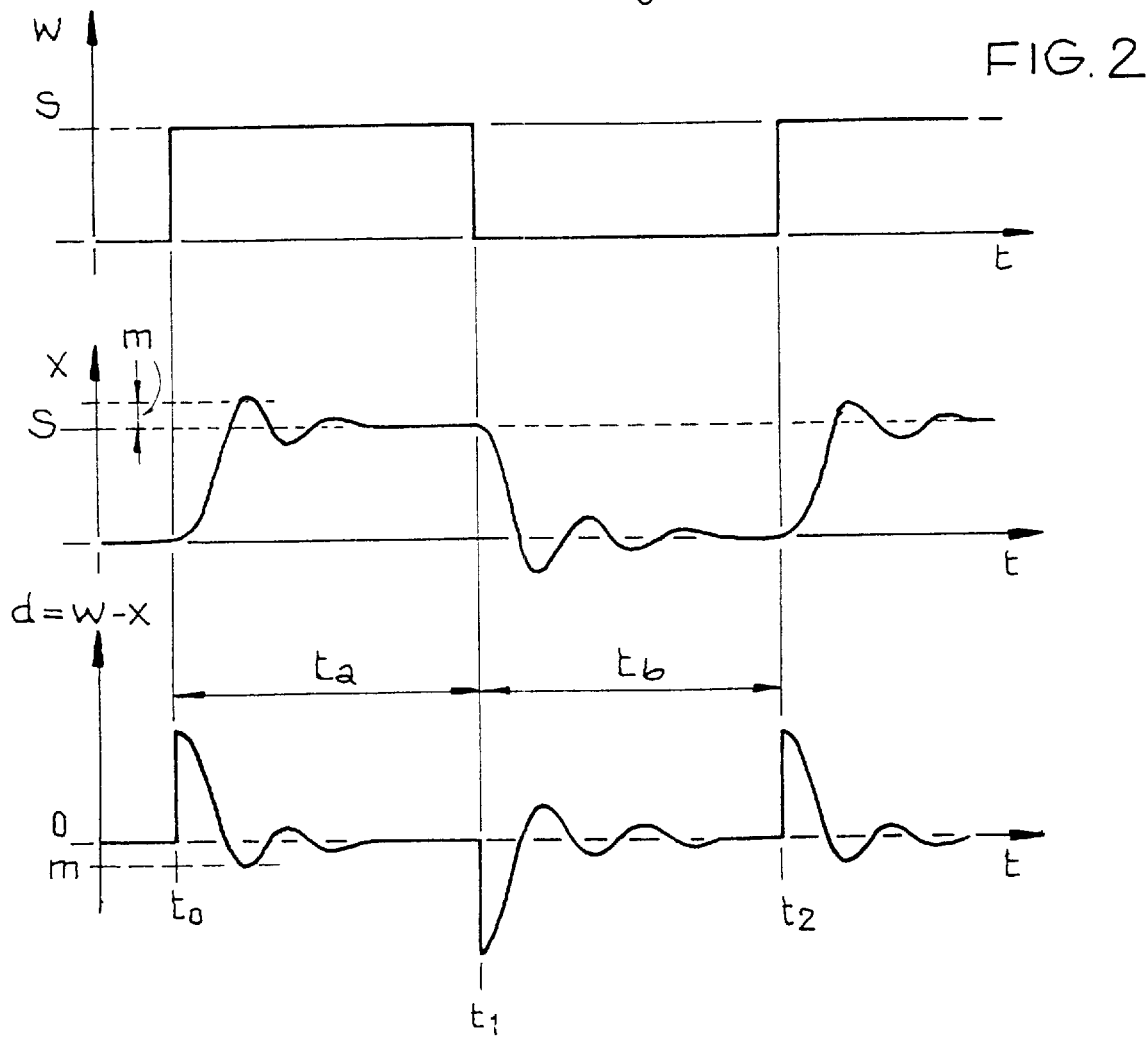
FIG. 2 a pulse diagram to illustrate the control behavior of the control loop shown in FIG. 1.

As shown in FIG. 2, a step rise or fall of the command variable w can cause the actual value of the controlled variable x to overshoot the setpoint value s of the controlled variable x. When this occurs, the actual value initially exceeds or falls below the setpoint value t by more than the tolerance value m representing a maximum permissible value, for example 10% of the setpoint value s, and then settles under damping to the setpoint value s.

In the present example, the overshoot of the actual value of the controlled variable x caused by a step rise of the command variable is evaluated. In order to counteract an excessive overshoot, i.e. an overshoot that exceeds the tolerance value m, the control deviation variable d is compared in the gain controller 2 with the tolerance value m and, as soon as the actual value of the controlled variable x exceeds the setpoint value s by more than the tolerance value m, the loop gain A of the control loop 1 is varied, i.e. reduced, by the gain controlled variable v output from the gain controller 2 in the direction acting opposite to the overshoot. If the actual value of the controlled variable x exceeds the setpoint value s by less than the tolerance value m, or not at all, the loop gain A is increased and hence the overshoot is made greater. In this way, the loop gain A is regulated in such a way that the actual value of the controlled variable x overshoots the setpoint value s by the tolerance value m. The pulse response of the control loop 1 is thus optimized to maximum edge steepness at maximum permissible overshoot and the working point of the control loop 1 is therefore stabilized.

The loop gain A of the control loop 1 can be varied by the gain controlled variable v, for example in discrete steps. If the actual value of the controlled variable x overshoots the setpoint value s by more or less respectively than the tolerance value m, the loop gain A is reduced or increased by one step, e.g. with each pulse of the command variable w, until the desired value has been reached.

Figure 3:
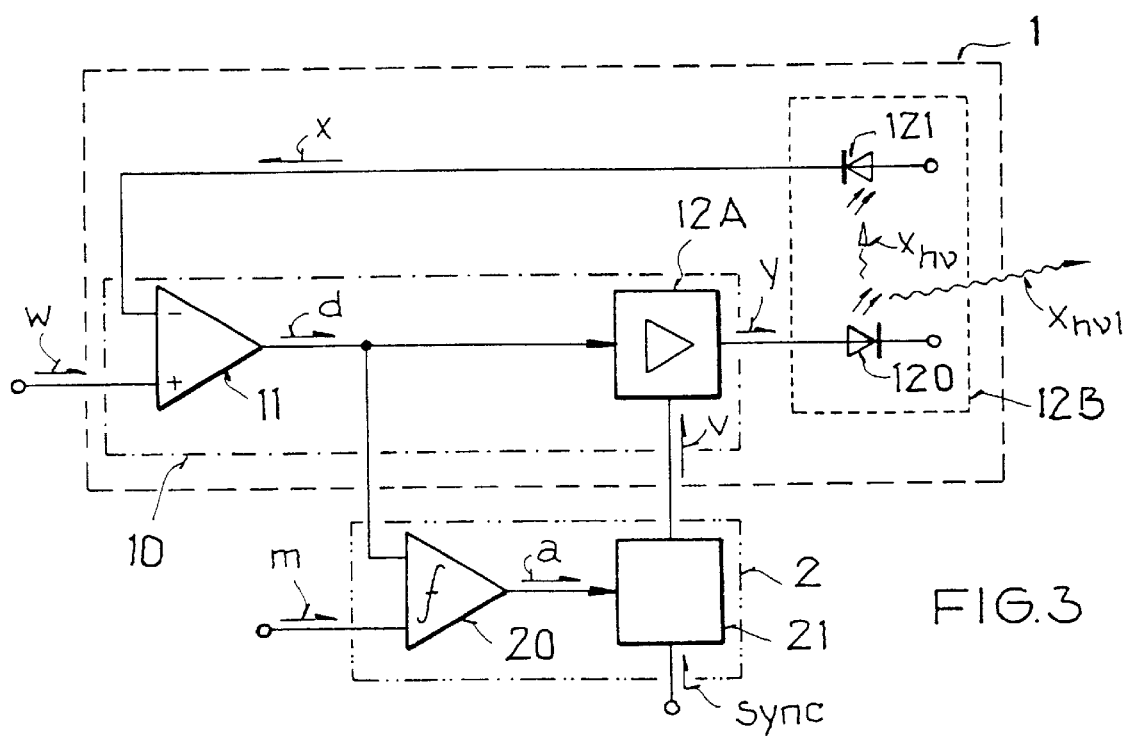
FIG. 3 a detail circuit diagram of the control loop shown in FIG. 1

As shown in FIG. 3, the control loop 1 has a feedback control system 10 with the setpoint comparison stage 11 and the control amplifier 12A and a controlled system 12B with a laser diode 120 and a photodetector 121. The control amplifier 12A and the controlled system 12B correspond to the feedback stage 12 as shown in FIG. 1. The control amplifier 12A generates from the control deviation variable d the manipulated variable y, from which the controlled system 12B in turn generates the controlled variable x and, as further controlled variable, the signal $x_{hv}$ corresponding to the controlled variable x, this signal $x_{hv}$ being emitted from the laser diode 120 and detected by the photodetector 121. A further optical signal $x_{hv1}$ proportional to the optical signal $x_{hv}$ is coupled out of the controlled system 12B as regulated useful signal the power of which is greater than the power of the optical signal $x_{hv}$ emitted to the photodetector 121 and which in the present example represents the signal to be regulated.

The setpoint comparison stage 11 is designed as a difference amplifier which forms the control deviation variable d as the difference between the command variable w and the fed-back controlled variable x and at the same time amplifies this difference if necessary. Furthermore, the control amplifier 12A is designed as a band-limiting amplifier stage, for example as a low-pass or integration stage, and thus determines primarily the frequency response and the phase response of the control loop 1.

The loop gain A of the control loop 1 is equal to the overall gain in the signal path of the control loop 1, i.e. equal to the product of the gains of the circuit elements in the signal path of the control loop 1. In the present example of embodiment, it is therefore equal to the product of the transfer functions (i.e. the gains) of the setpoint comparison stage 11, the control amplifier 12A and the controlled system 12B and is regulated by variation of the gain of the control amplifier 12A. The gain controller 2 includes for this purpose a comparator stage 20 to which the control deviation variable d and the tolerance value m are input and which generates from these a controlled variable a corresponding to the sign of the difference between the tolerance value m and the control deviation variable d. The gain controller 2 also includes on the output side of the comparator stage 20 a servo unit 21 which drives the control amplifier 12A. The servo unit 21 is designed as an integration stage for example and generates from the controlled variable a the gain controlled variable v which is required to regulate the gain of the control amplifier 12A.

The gain controller 2 is activated by a trigger signal sync in order to evaluate the control deviation variable d. Through the trigger signal sync (this can be the command variable w or a signal derived from it), in the present example shown in FIG. 2, a time window $t_a$ between the rising and the next falling signal edge of the command variable w, i.e. between times $t_0$ and $t_1$, is defined as evaluation window in which the gain controller 2 is active. Outside of this evaluation window, the gain controller 2 is inactive, so that only the overshoot of the actual value of the controlled variable x caused by a positive step in the command variable w is evaluated for regulation of the loop gain A.

With the control loop 1, fluctuations in the emission power of the laser diode 120 are compensated and the change in pulse response of control loop 1 caused by these fluctuations is corrected due to the adjustment of the gain of the control amplifier 12A so that a shift of the working point of control loop 1 into an unfavorable zone is prevented. In the present example shown in FIG. 2, the overshoot of the actual value of the controlled variable x beyond the setpoint value s of the controlled variable x, which overshoot is caused by a positive step change of the command variable w, is evaluated for this purpose in order to regulate the loop gain A. An evaluation of the overshoot of the controlled variable x caused by a negative step change of the command variable w is, however, also conceivable. In this case, the sign of the tolerance value m must be inverted and, through the trigger signal sync, the time window $t_b$ situated between the falling and the next rising signal edge of the controlled variable x, i.e. between the time points $t_1$ and $t_2$, must be defined as evaluation window in order to evaluate the control deviation variable d.

The present circuit arrangement is optimally suited for use in a drive for optical storage disks, especially for so-called (rewritable) "digital versatile disks" (DVDs).

What is claimed is:

1. A method for regulating a controlled variable by means of a control loop comprising the steps of:

Supplying a pulse-shaped command variable as an input value to the control loop, said command variable determining a setpoint value of the controlled variable and said control loop having a loop gain; and Regulating the loop gain of the control loop in such a way that the actual value of the controlled variable overshoots the setpoint value of the controlled variable by a preset tolerance value, said regulating step occurring at each rising and falling signal edge or change of the pulse-shaped command variable.

2. The method in accordance with claim 1, wherein the loop gain of the control loop is regulated by automatically controlling the gain of a control amplifier driven by a gain controller.

3. The method in accordance with claim 2, wherein the tolerance value is determined by the command variable.

4. The method in accordance with claim 3, wherein, when there is a change in the command variable, the tolerance value is varied by a value proportional to the change in the command variable.

5. The method in accordance with claim 2, wherein a control deviation variable corresponding to the difference between the command variable that determines the setpoint value and the actual value of the controlled variable is formed by a setpoint comparison stage, and wherein the control deviation variable is compared in the gain controller with the tolerance value and the loop gain of the control loop is controlled in accordance with the result of this test.

6. The method in accordance with claim 5, wherein a time window situated between two successive signal edges of the controlled variable is defined by a trigger signal as an evaluation window in which the control deviation variable is evaluated in order to automatically control the loop gain.

7. A circuit arrangement for performing the method in accordance with claim 6, wherein a controlled system is provided to generate the controlled variable and a feedback control system containing the setpoint comparison stage and the control amplifier is provided to drive the controlled system, the setpoint comparison stage being connected with the controlled system via the control amplifier, and wherein the gain controller has a comparator stage to generate a controlled variable corresponding to the sign of the difference between the tolerance value and the control deviation variable and a servo unit on the output side of the comparator stage, by means of which the control amplifier is driven for controlling the gain.

8. The circuit arrangement in accordance with claim 7, wherein the control amplifier is designed as a band-limiting amplifier stage.

9. The circuit arrangement in accordance with claim 8, wherein the control amplifier is designed as a low-pass or integrator stage.

10. The circuit arrangement in accordance with claim 7, wherein the controlled system has a light source driven by the control amplifier to generate an optical signal and a photodetector 121 to generate the controlled variable corresponding to the optical signal.

11. Circuit arrangement in accordance with claim 10, wherein the light source is designed as a laser diode.

12. Use of the method in accordance with claim 1 for automatically controlling the emission power of pulse-operated light sources.

13. Use of the method in accordance with claim 1 for automatically controlling the emission power of pulse-operated laser diodes or light-emitting diodes.

* * * * *